Jan. 3, 1967  J. G. LESCHEN  3,295,937
TITANIUM CERAMIC COMPOSITE BODIES
Filed May 31, 1962

Inventor:
John G. Leschen,
by Charles L. Watts
His Attorney.

United States Patent Office 3,295,937
Patented Jan. 3, 1967

3,295,937
TITANIUM CERAMIC COMPOSITE BODIES
John G. Leschen, Schenectady, N.Y., assignor to General Electric Company, a corporation of New York
Filed May 31, 1962, Ser. No. 198,942
3 Claims. (Cl. 29—195)

The present invention relates generally to ceramic-metal composites and is more particularly concerned with new magnesia and magnesia-alumina spinel bodies and with novel composite structures of these bodies vacuum-tightly bonded to titanium metal elements. This invention also concerns a new method of making these bodies.

In the manufacture of electronic apparatus such as specialty vacuum tubes and some types of thermionic converters, metal-ceramic combinations including titanium are often provided as envelopes. At operating temperatures below 500° C. to 600° C., there are a number of ceramic compositions which have for some time been known in the art as being compatible with titanium and thus suitable for this purpose. At the same time, however, it has long been recognized that the substantial silica content of these compositions is deleterious at higher temperatures in that an oxide cathode poisoning effect results when silica is present and leads to drastic reduction of electron emission. Thus, even though the material advantages of higher temperature operation were fully appreciated, the operating temperature limitation imposed by the presence of silica has been accepted down to the present time as there has previously been no successful effort to find an answer to the problem of eliminating the silica while retaining all the essential and desirable physical characteristics of the titanium-matching, silica-containing ceramics.

It is, accordingly, a primary object of the present invention to provide a ceramic material which could be used with titanium metal to produce a vacuum tube envelope free from the important shortcomings, derelictions and limitations of prior composite bodies of this general type.

It is a further important object of this invention to provide an envelope which meets the aforesaid high temperature operation requirements and would at the same time be easy and economical to produce and would have the physical strength characteristics required for practical service in electron tube and thermionic converter applications.

It is still another object of this invention to provide a method or process by which the foregoing desired ceramic material can be produced readily and consistently in respect to physical properties.

Additional objects of this invention and special advantages of these new composite bodies will become apparent to those skilled in the art upon consideration of the detailed description set out below, taken in conjunction with the drawings accompanying and forming a part of this specification, in which.

Figure 1:
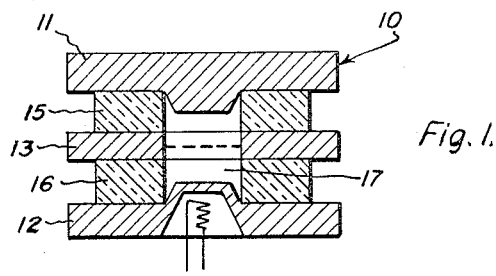
FIG. 1 is a sectional semi-schematic view of a vacuum tube in which ceramic elements are permanently bonded to titanium elements in a preferred embodiment.

Briefly described, a composite body of this invention comprises a body of substantially pure titanium permanently joined to a crystalline ceramic body by means of a soldered joint forming a vacuum-tight bond. Generally, the ceramic body consists essentially of a fired mixture of magnesia and magnesia-alumina spinel within certain compositional limits, which is substantially silica-free but contains between 0.05 percent and 1.0 percent of titania and has a coefficient of thermal expansion between 25° C. and 1000° C. between about 9.0 and $11.0 \times 10^{-6}$ centimeter per centimeter per degree C. More specifically, in the preferred form of the invention, this ceramic body contains 0.1 part of titania, 50 parts of magnesia and 50 parts of magnesia-alumina spinel and has a coefficient of thermal expansion over the aforesaid range of $10.0 \times 10^{-6}$ centimeter per centimeter per degree C. Thus, in this case, the ceramic body is virtually a perfect thermal expansion and contraction match to the titanium body over the range from room temperature to 1000° C. As in the general case defined above, however, in this preferred composite body no electrically-conducting film is produced either in the course of its production or during use.

These new ceramic compositions and bodies are prepared in accordance with the method of this invention by the steps, generally, of coprecipitating alumina and magnesia with or without titania, separating and drying the resulting coprecipitate, calcining the coprecipitate, pressing the coprecipitate in powder form to produce a compact, and finally sintering the resulting compact in an atmosphere oxidizing with respect to magnesia at a temperature between 1700° C. and 1800° C. for between one and five hours. An atmosphere of pure oxygen is preferred for this purpose. The proportions of the magnesia and magnesia-alumina spinel in the calcine are adjusted according to the thermal expansion characteristics desired in the final product and for the purposes of making titanium-ceramic electron tube composites, the magnesia in the ultimate sintered ceramic will be in amount between 40 and 60 parts while the magnesia-alumina spinel will be in amount between 60 and 40 parts, respectively. Thus, the relative proportions of the magnesia and alumina of the coprecipitate will correspond stoichiometrically to this spinel-magnesia relationship and the mother solution of the coprecipitate is formulated accordingly.

In the preferred practice of this invention, small amounts of titania are incorporated in the magnesia-alumina coprecipitate to promote sintering of the ceramic. This is accomplished by dissolving titanium tetrachloride in nitric acid and after treatment to reduce the chloride content to acceptable limits, the resulting solution is added in requisite amounts to the mother solution of magnesium nitrate and aluminum nitrate.

The magnesium, aluminum and titanium are coprecipitated from this mother solution by the addition of ammonium hydroxide. The solid and liquid phases are separated by filtration and the resulting filter cake is dried at a suitable temperature such as 140° C. and then calcined at a maximum temperature of 900° C. reached over a heating period of several hours and maintained for one hour, and then furnace-cooled. Reduction of the calcine to powder is then preferably accomplished by ball-milling and the powder is formed into compacts of the general size and shape desired in the final product under pressure of 10,000 p.s.i. to 85,000 p.s.i. or higher, if that is desired for any reason.

Firing of the compact, i.e. sintering of it, may be done at temperatures within the range from 1700° C. to 1800° C., but preferably the temperature is maintained substantially constant throughout the operation and also preferably the temperature is 1750° C. and the sintering period is only one hour long since at the preferred 20,000 p.s.i. maximum density is thereby obtained.

With reference to the drawings, an electronic tube 10 is made by combining in a cathode-anode-grid assembly a pair of washer-like elements as insulators and spacers between the electrical components of the assembly. Thus, as shown in FIG. 1, tube 10 comprises an anode 11, a cathode 12 and a grid 13, all of substantially pure titanium, and spacers 15 and 16 of the ceramic composition above described. The ceramic elements 15 and 16 are disposed between the anode and grid and between the grid and the cathode, respectively, and a closed chamber 17 is provided in the tube by virtue of the fact that the disk-like anode and cathode close the top and bottom of the open-ended cylinder defined by the washer-like parts including grid 13 and ceramic elements 15 and 16.

The metallic members of the FIG. 1 assembly are sealed to ceramic members 15 and 16 by any known wet soldering or brazing technique such as, for example, that disclosed in U.S. Patent 2,570,248, Kelley, at their abutting surfaces following evacuation of chamber 17 and "bake-out," as is well-known in the electronic tube art. Electrical connections may be provided for anode 11, grid 13 and cathode 12 in any suitable known manner, the exposed surfaces of these parts being employed for this purpose.

Figure 2:
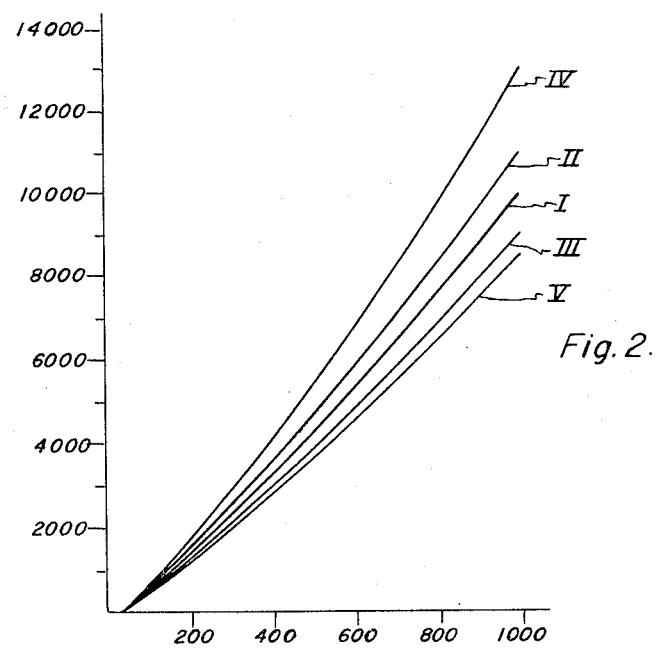
FIG. 2 is a chart bearing curves showing the linear contraction characteristics of titanium metal and of several of my new ceramic bodies; and, FIG. 3 is a chart bearing curves illustrating the effects of titania content, compacting pressure and sintering temperature upon the permeability of the ultimate ceramic body.

Referring to FIG. 2, contraction in centimeters per centimeter $\times 10^{+6}$ is plotted against temperature in degrees C. for sponge titanium metal, magnesia and magnesia-alumina spinel, all in substantially pure form, and for three magnesia and magnesia-spinel ceramics contemplated by this invention. Thus, curve I represents the contraction characteristics of sponge titanium and also the 50–50 spinel-magnesia composition, while curves II and III represent two ceramic compositions near the upper and lower limits, respectively, of the compositional range set out above and in the appended claims. Curve IV represents linear contraction characteristics of magnesia, and curve V represents these characteristics for magnesia-alumina spinel.

In view of the large difference between the expansion coefficients of magnesia-alumina spinel and magnesia (curves IV and V), it is surprising that composites of these materials can be produced which will maintain their integrity over the full operating range despite the thermal microstresses. While neither magnesia alone nor spinel alone can be successfully employed in combination with titanium metal parts for the purposes here contemplated, composites of this invention representing extremes of thermal expansion coefficient values can be used over prolonged periods of time and through a number of heating and cooling cycles without showing any tendency toward cracking or breaking or otherwise indicating the existence of thermal expansion and contraction stresses.

The density of the ceramic portions of these composite bodies has not been found to be highly critical but it is desirable that they be vacuum-tight. Vacuum-tightness can be obtained at densities over 96 or 97 percent of theoretical density in the finished fired ceramic bodies and on the other hand, I have found that bodies having a density greater than 99 percent of theoretical may be inferior in terms of vacuum-tightness. In other words, porosity is not damaging to the vacuum-tightness characteristic so long as the pores do not connect all the way through the ceramic body so that a substantial gas pressure differential through the ceramic body cannot be maintained under conditions of operation of the vacuum tube or other device in which the composite structure is employed.

Figure 3:
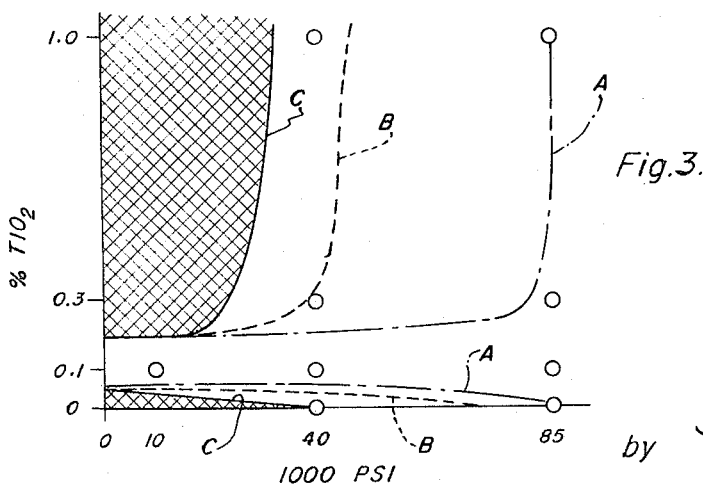

With reference to FIG. 3, results of tests of products prepared in accordance with this invention are compared in terms of porosity and leak detection for a variety of production conditions in tests subsequently to be described in detail. Percent titania is plotted against compacting pressure in thousands of pounds per square inch for three different sintering temperatures. Curve A represents sintering temperature of 1700° C. while curve B and curve C represent, respectively, sintering temperatures of 1750° C. and 1800° C. It will be understood that these curves do not represent series of points but are arbitrarily drawn to separate good from poor of composition and forming pressure.

A total of 36 specimens were prepared and tested, with the results indicated on the chart of FIG. 3. Generally, these 36 speciments were of four different titania contents, viz. 1.0 percent, 0.3 percent, 0.1 percent, and zero titania; and they were compacted at three different pressures, specifically, 10,000 p.s.i. 40,000 p.s.i. and 85,000 p.s.i. In the first series of four different compositions, only the three specimens containing 0.1 percent titania passed a leak-detector test hereinafter fully described and the other nine specimens in this group pressed at 10,000 p.s.i. were porous. Similarly, in respect to the specimens prepared under a compacting pressure of 40,000 p.s.i. only the specimens containing 0.1 percent titania passed this leak-detector test when sintered at 1700° C. and 1750° C. and also at 1800° C. However, when fired at 1750° C., the specimen containing 0.3 percent titania passed the leak-detector test and when fired at 1800° C., the specimen containing no titania passed the same test. Also when sintered at 1800° C., the sample containing 1.0 percent titania passed the leak-detector test. All the specimens prepared under a compacting pressure of 85,000 p.s.i. passed all the tests to which they were subjected. Thus, all the specimens sintered at 1700° C. passed the leak-detector test. Specimens otherwise the same as set out above, except for the sintering temperature being 1850° C., failed to pass any of these porosity and leak-detector tests.

The following illustrative, but not limiting, examples of this invention as it may be carried out, and in some cases actually has been practiced, are furnished for the purpose of further informing those skilled in the art of the precise details and procedures of the invention.

*Example I*

A coprecipitate of magnesia and alumina containing a small amount of titania was prepared by making solutions of reagent-grade magnesium and aluminum nitrates in distilled water and subsequently mixing them and adding ammonium hydroxide to the resulting solution. These solutions were prepared in the approximate concentrations of 220 grams magnesium nitrate (60 grams magnesia equivalent) and 270 grams aluminum nitrate (65 grams alumina equivalent) per liter of solution. The actual concentrations were determined by measuring the specific gravities and then consulting standard chemical tables. Appropriate volumes of these two solutions were then mixed to give a magnesium-aluminum ratio representing equal parts of magnesia and magnesia-alumina spinel, and an equal amount of distilled water was added. Into each 500 milliliters of this final solution were stirred 100 ml. of reagent-grade ammonium hydroxide, and stirring was vigorously continued until the precipitate attained a smooth texture. The product was suction-filtered while being washed with 1500 ml. of distilled water containing a small amount of ammonia. The filter cake was then dried between aluminum foil sheets in an oven at about 140° C., transferred to loosely covered platinum boats, heated under reduced pressure at 100° C. per hour to 900° C., held a hour, and furnace-cooled. The resulting mass was quite friable and could be easily broken up in an alumina mortar and pestle, before being ball-milled for five hours with alumina balls in a polyethylene bottle.

Titanium in solution with nitric acide was added to the base solution before precipitation in an amount corresponding to 0.1 percent titania in the desired magnesia-alumina coprecipitate. The "titanium nitrate" was freshly prepared from a purified solution of titanium tetrachloride, which was passed through five cycles of precipitation by ammonia, filtering, washing, and re-solution in nitric acid. This treatment was adequate to lower the chloride content beyond the point where the standard silver nitrate test gave any indication. Since the titanium solution would be substantially diluted upon addition to the base solution, any added chloride was thus well below the level indicated by the reagent specifications to be already present (0.001 percent).

The ball-milled, calcined material in powder form was compacted isostatically, the powder being loaded into three-quarter-inch diameter rubber surgical tubing supported by a wooden block several inches long and was uniformly settled by gentle vibration before the tubing was closed with a heavy rubber plug. The container was then evacuated through a hypodermic needle inserted through the plug, thus "presetting" the powder cylinder and minimizing the amount of air that might be trapped in the compact during pressing. The cylinder was pressed in an oil-filled chamber at a pressure of 10,000 p.s.i., removed, washed, and the rubber coating stripped off. The resulting slug was then sliced dry into pellets about a quarter of an inch high, the end-pieces of the cylinder being discarded. As-pressed densities of small samplings of pellets were measured with a mercury porosimeter operated at a pressure sufficiently low that orifices less than 100 microns in diameter were not penetrated. Samples were discarded after measurement.

Sintering of the pellets was carried out in a loosely-closed hollow boat that had been previously sintered of the base material. Before the boat was closed for a run, the pellets were covered with powder of the base composition. The boat was held in a relatively impermeable alumina tube passing through a gas-fired kiln, and a flow of oxygen through the tube was maintained during the entire heating and cooling cycle. A sintering temperature of 1800° C. was held within ±10° C. as measured by an optical pyrometer; time at sintering temperature was one hour.

Examination of the resulting product revealed that the grains were quite small, being about 2 to 4 microns in average size and tightly interlocked. The density of the product was approximately 3.57 grams per cubic centimeter and in all instances where the pellets were bonded to titanium parts the bonding was readily accomplished by the patented technique previously referred to herein and the bond proved to be vacuum-tight and the resulting composite body did not indicate any tendency to develop destructive stresses in the period of heating and cooling over the room temperature to 730° C. range. Permeability of these pellets was tested in two different ways, first, by a screening test using a red penetrating dye, and, second, by a helium leak-detection test for those specimens which were dye-resistant.

In the first test, a segment was ground from the edge of each disk to expose the interior. The disks were immersed in the dye for 10 to 15 minutes, removed and washed, and a second segment was ground overlapping the first. The degree and kind of dye penetration from the original surfaces and from the first ground surface could easily be observed. Those specimens revealing no penetration were used to close a small port of a vacuum system and, after pump-down, were sprayed with a jet of helium. Any appreciable penetration was detected by a mass spectrometer attached to the vacuum system.

Densities of dye-resistant specimens were measured by a displacement method using a crystal of fused magnesia (density 3.58 grams per cm.$^3$) as a standard.

*Example II*

Following the procedure of Example I in all respects except as to the amounts of reagents employed, a product may be obtained which differs significantly from that of Example I only in respect to its coefficient of thermal expansion. Thus, the ratio of free to combined magnesia in the calcined coprecipitate will correspond to 40 parts of magnesia to 60 parts of magnesia-alumina spinel and the amount of titania will be 0.1 part.

*Example III*

Again, following the Example I steps, a product is made by adding titania in an amount corresponding to 1.0 percent (or part) of the calcined magnesia-alumina coprecipitate. Also, as a departure from the Example I procedure, a compacting pressure of 85,000 p.s.i. is applied to the calcined coprecipitate powder, and as a further departure, the sintering temperature is 1700° C. This product has important characteristics and properties in common with that of Example I including a coefficient of thermal expansion closely approximating that of titanium.

Wherever in the specification and in the appended claims parts, proportions or percentages are stated, reference is to the weight basis unless otherwise specifically stated.

Composite bodies generally similar to those disclosed and claimed herein, but not necessarily containing any titania, are disclosed and generically claimed in United States Patent 3,113,846 which issued December 10, 1963 from my copending application Serial No. 198,141, filed May 31, 1962 and entitled, "Titanium Ceramic Composite Bodies," and assigned to the assignee of the present invention.

Having thus described this invention in such full, clear, concise and exact terms as to enable any person skilled in the art to which it pertains to make and use the same, I state that the subject matter which I regard as being my invention is particularly pointed out and distinctly claimed in what is claimed, it being understood that equivalents or modifications of, or substitutions for, parts of the specifically-described embodiments of the invention may be made without departing from the scope of the invention as set forth in what is claimed.

What I claim as new and desire to secure by Letters Patent of the United States is:

1. A composite body comprising at least one body of substantially pure titanium permanently joined to at least one vacuum-tight crystalline ceramic body by means of a solder joint to form a vacuum-tight bond, the ceramic body consisting essentially of a fired mixture of magnesia and magnesia-alumina spinel and titania having compositional limits between 40 and 60 parts of magnesia and between 60 and 40 parts of magnesia-alumina spinel, respectively, and containing between 0.05 part and 1.0 part of titania, the ceramic body being substantially silica-free and having a coefficient of thermal expansion between 25° C. and 1000° C. of about $9.0 \times 10^{-6}$ centimeter per centimeter per degree C. to about $11.0 \times 10^{-6}$ centimeter per centimeter per degree C.

2. A composite body comprising at least one body of substantially pure titanium permanently joined to a crystalline ceramic body by means of a solder joint to form a vacuum-tight bond, the ceramic body being silica-free and consisting essentially of a fired mixture of magnesia and magnesia-alumina spinel and titania and containing 50 parts of magnesia and 50 parts of magnesia-alumina spinel and 0.10 part of titania, the ceramic body being substantially silica-free and having a coefficient of thermal expansion between 25° C. and 1000° C. of about $10.0 \times 10^{-6}$ centimeter per centimeter per degree C.

3. For use in the production of metal-ceramic electron tubes, a silica-free crystalline ceramic body bondable vacuum-tightly to a titanium metal tube component and consisting essentially of a fired mixture of magnesia and magnesia-alumina and titania having compositional limits between 40 and 60 parts of magnesia and between 60 and 40 parts of magnesia-alumina spinel, respectively, and containing between 0.05 part and 1.0 part of titania, the ceramic body having a coefficient of thermal expansion between 25° C. and 1000° C. of about $9.0 \times 10^{-6}$ centimeter per centimeter per degree C. to about $11.0 \times 10^6$ centimeter per centimeter per degree C.

(References on following page)

References Cited by the Examiner

UNITED STATES PATENTS

| | | | |
|---|---|---|---|
| 2,872,311 | 2/1959 | Marshall et al. | 75—200 |
| 2,894,836 | 7/1959 | Kolbl et al. | 75—200 |
| 2,917,140 | 12/1959 | Omley | 287/189.365 |
| 2,962,136 | 11/1960 | Pincus | 287/189.365 |
| 3,058,834 | 10/1962 | Koehgyi | 106—62 |
| 3,082,104 | 3/1963 | Belz | 106—62 |
| 3,113,846 | 12/1963 | Leschen | 29—195 |
| 3,129,070 | 4/1964 | Westbrook et al. | 287/189.365 |

FRANK L. ABBOTT, *Primary Examiner.*

JOHN F. CAMPBELL, RICHARD W. COOKE, JR.,
*Examiners.*

J. C. HOLMAN, J. D. LISTER, M. O. WARNECKE,
*Assistant Examiners.*